C. W. HESS.
GRENADE THROWER.
APPLICATION FILED MAY 2, 1918.
1,274,882.
Patented Aug. 6, 1918.
2 SHEETS—SHEET 1.
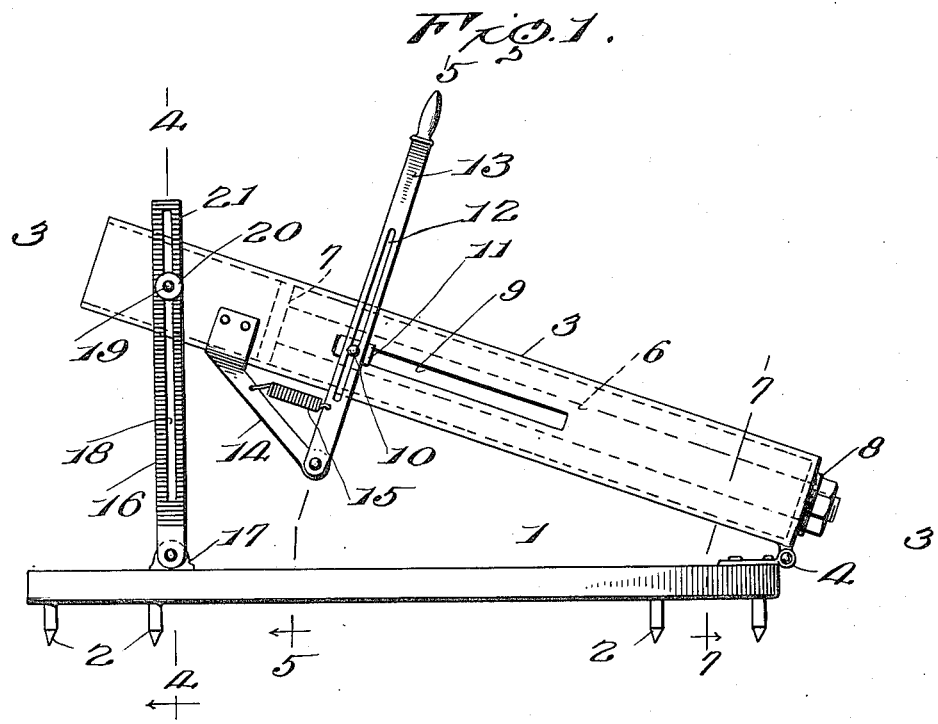
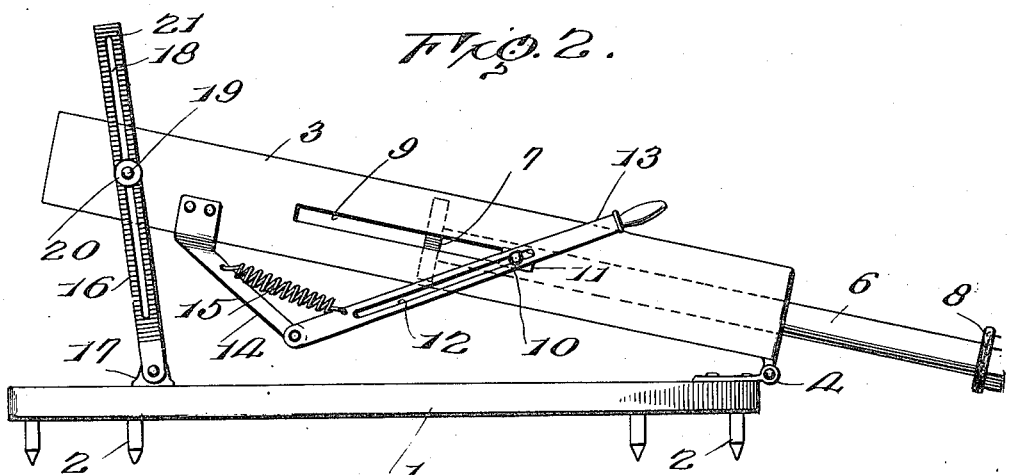
Inventor
Clyde W. Hess
By Lacey & Lacey,
Attorneys C. W. HESS.
GRENADE THROWER.
APPLICATION FILED MAY 2, 1918.
1,274,882.
Patented Aug. 6, 1918.
2 SHEETS—SHEET 2.
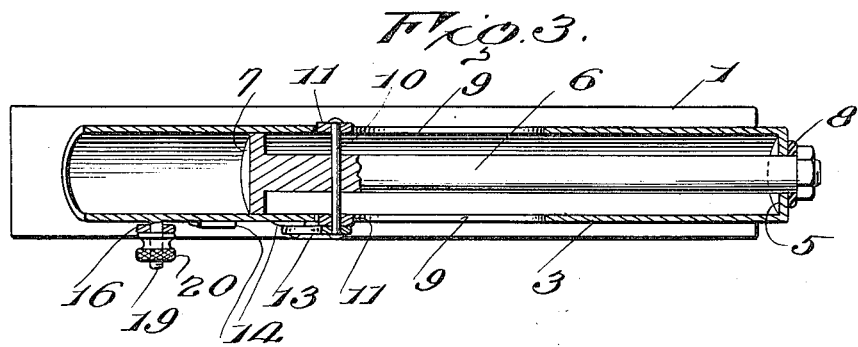
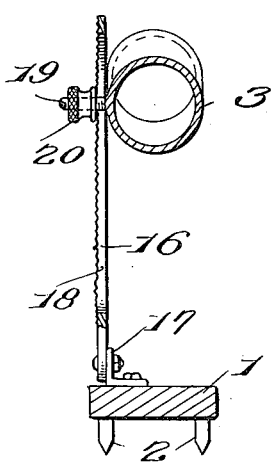
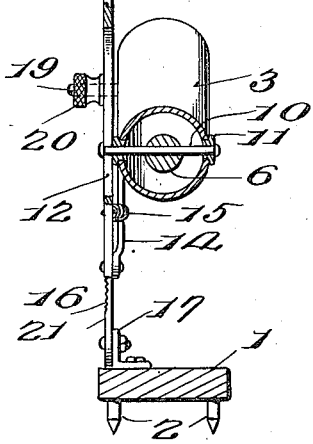
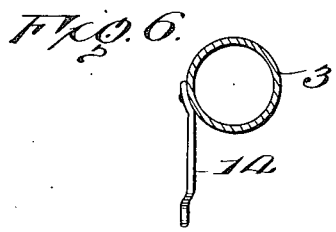
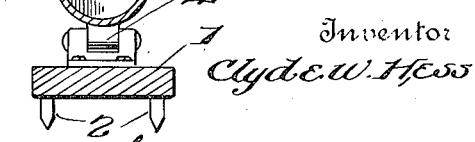
Inventor
Clyde W. Hess
By Lacey & Lacey
Attorneys

UNITED STATES PATENT OFFICE.

CLYDE W. HESS, OF ELIZABETH, NEW JERSEY, ASSIGNOR OF ONE-HALF TO BLANCHE I. HESS, OF ELIZABETH, NEW JERSEY.

GRENADE-THROWER.

1,274,882.  Specification of Letters Patent.  Patented Aug. 6, 1918.

Application filed May 2, 1918. Serial No. 232,055.

*To all whom it may concern:*

Be it known that I, CLYDE W. HESS, a citizen of the United States, residing at 205 Baltic street, Elizabeth, in the county of Union and State of New Jersey, have invented certain new and useful Improvements in Grenade-Throwers, of which the following is a specification.

This invention is a machine for throwing bombs and grenades and has for its object the provision of an easily operated mechanism whereby bombs or grenades may be propelled by hand and accuracy in the landing thereof attained. The invention is illustrated in the accompanying drawings and will be hereinafter first fully described and then more particularly pointed out in the claims.

In the drawings:

Figure 1 is a side elevation of my improved machine showing one adjustment of the same, Fig. 2 is a similar view showing a different position of the parts, Fig. 3 is a longitudinal section on the line 3—3 of Fig. 1, Fig. 4 is a transverse section on the line 4—4 of Fig. 1, Fig. 5 is a transverse section on the line 5—5 of Fig. 1, Fig. 6 is a detail section more particularly showing the support or fulcrum bar for the operating lever, Fig. 7 is a detail transverse section on the line 7—7 of Fig. 1.

In carrying out my invention I employ a base 1 which may be of any desired material and of any preferred form and is provided on its under side with pegs or feet 2 adapted to enter the ground so as to support the base over a trench or in any other necessary position. To the rear end of the base I connect a barrel 3 by a hinge 4 so that the said barrel may be set at any desired elevation. This barrel has an open front end and is provided at its rear end with a guide 5 for a plunger rod 6 carrying a plunger 7 at its front end which fits closely but slidably within the barrel. At its rear end the plunger rod is equipped with a stop 8 which by contact with the guide 5 limits the forward movement of the plunger, as will be readily understood. In the sides of the barrel at diametrically opposite points, I provide the longitudinal slots 9 through which a connecting pin 10 passes. This connecting pin fits slidably in the slots and may carry bearing blocks 11 so as to guard against oscillation of the pin with a consequent binding of the same in the slots. The central portion of the pin passes through the plunger rod 6 so that when the pin is moved longitudinally of the barrel the plunger rod and plunger will be likewise moved and consequently a bomb or grenade placed within the barrel in advance of and resting against the plunger, will be projected from the barrel. One end of the connecting pin 10 is engaged in a longitudinal slot 12 in an operating lever 13 which lever is pivotally secured at its lower end to the lower end of a supporting fulcrum bar or bracket 14 which is secured to the barrel as shown. A spring 15, secured to the lever and to said bracket or supporting fulcrum arm, holds the lever normally in its forward position. The front end of the barrel is adjustably supported by a standard or post 16 which is pivoted or hinged at its lower end to a bracket 17 on the base 1, said standard or post being constructed with a longitudinal slot 18 through which passes a threaded stud or pin 19 projecting laterally from the barrel. A thumb nut 20 mounted upon the outer end of said pin or stud is adapted to be turned home against the standard or post so as to secure the barrel at any desired elevation and the outer side of said post or standard may be provided with a graduated scale as indicated at 21 to facilitate the adjustment of the barrel.

It is thought the manner of using the machine will be obvious from what has been said. When it is desired to project a bomb or grenade the operating lever is swung backward to its full extent as indicated in Fig. 2, the bomb or other projectile being placed within the barrel so as to rest against the plunger 7. In this position of the operating lever, the spring 15 will be expanded so that upon release of the lever the contraction of the spring will at once throw the lever to its forward position, the forward movement being arrested by the impact of the pair of guide blocks 11 with the front ends of the slots 9 and the engagement of the stop 8 against the guide 5. The momentum acquired by the projectile will carry it from the barrel and the flight of the projectile together with the striking point of the same will be determined by the elevation at which the barrel is set. The supporting standard or post 16 is pivotally mounted so that the pin and slot connection between the barrel and said post will accommodate the relative movement of these parts and permit the barrel to be moved upwardly or downwardly, as will be readily understood.

It will be readily noted that I have provided an exceedingly simple and inexpensive device by the use of which grenades and similar projectiles may be easily thrown and accuracy in the use of the same attained. When grenades are thrown by hand, uncertainty of aim exists notwithstanding expertness on the part of the thrower, but by the use of my device the projectile may be caused to strike the desired mark with certainty inasmuch as the barrel can be easily set to vary the path followed by the projectile and when the proper range has once been found succeeding operations of the device will cause each projectile to positively hit the mark.

Having thus described the invention, what is claimed as new is:

1. An apparatus for the purpose set forth comprising a base, a barrel hinged at its rear end to the base, an adjustable support for the front end of the barrel, a plunger slidably mounted within the barrel, means for holding the plunger normally projected, and hand controlled means for retracting the plunger.

2. An apparatus for the purpose set forth comprising a base, a barrel hinged at its rear end to the base, a plunger within the barrel, means for reciprocating the plunger, and a supporting standard hinged at its lower end to the base and having a pin and slot connection with the front end of the barrel.

3. An apparatus for the purpose set forth comprising a base, a barrel hinged at its rear end to the base, an adjustable support for the front end of the barrel, a plunger slidably mounted within the barrel, a hand lever operatively connected with the plunger, and means acting on said lever to yieldably hold the plunger in a projected position.

4. An apparatus for the purpose set forth comprising a base, a barrel hinged at its rear end to the base and provided with a longitudinal slot in its side, a plunger mounted within the barrel, a guide at the rear end of the barrel for said plunger, a stop adapted to impinge against said guide to limit the forward movement of the plunger, a guide slidably mounted in the slot in the side of the barrel, a hand lever fulcrumed at the side of the barrel and having a pin and slot connection with said guide and the plunger, and yieldable means acting on said lever to hold the same and the plunger normally projected.

5. An apparatus for the purpose set forth comprising a base, a barrel supported upon the base and provided with a longitudinal slot in its side, a plunger slidably mounted in the barrel, a fulcrum arm secured to and depending from the barrel, a hand lever pivoted at its lower end to said fulcrum arm and provided with a longitudinal slot, a guide slidably mounted in the longitudinal slot of the lever, the said guide and the plunger, and a spring connecting the lever and the fulcrum arm.

In testimony whereof I affix my signature.

CLYDE W. HESS. [L. S.]